United States Patent
Kyrtsos

(10) Patent No.: US 6,257,065 B1
(45) Date of Patent: Jul. 10, 2001

(54) STRAIN GAUGE VIBRATION SENSOR

(75) Inventor: Christos T. Kyrtsos, Southfield, MI (US)

(73) Assignee: Meritor Heavy Systems, L.L.C., Troy, MI (US)

(*) Notice: Subject to any disclaimer, the term of this patent is extended or adjusted under 35 U.S.C. 154(b) by 0 days.

(21) Appl. No.: 09/275,621

(22) Filed: Mar. 24, 1999

(51) Int. Cl.$^7$ ................................................ G01P 15/12
(52) U.S. Cl. ................ 73/654; 73/514.33; 73/514.37; 73/660
(58) Field of Search .......................... 73/654, 652, 660, 73/514.33, 514.36, 514.37; 338/43; 340/438, 440; 464/23

(56) References Cited

U.S. PATENT DOCUMENTS

| | | | |
|---|---|---|---|
| 3,023,627 | * 3/1962 | Geyling | 73/514.33 |
| 3,478,604 | * 11/1969 | Evans | 73/514.33 |
| 3,828,294 | * 8/1974 | Baba et al. | 73/514.33 |
| 4,114,453 | * 9/1978 | Sandler | 73/514.33 |
| 4,348,905 | 9/1982 | Nishimura et al. | 73/654 |
| 4,458,536 | 7/1984 | Ahn et al. | 73/652 |
| 5,001,933 | 3/1991 | Brand | 73/651 |
| 5,034,729 | 7/1991 | Lundquist | 340/683 |
| 5,396,223 | 3/1995 | Iwabuchi et al. | 340/690 |
| 5,415,026 | 5/1995 | Ford | 73/651 |
| 5,610,337 | 3/1997 | Nelson | 73/651 |
| 5,641,904 | 6/1997 | Kopp et al. | 63/457 |
| 5,742,235 | 4/1998 | Miché | 340/690 |

* cited by examiner

Primary Examiner—John E. Chapman
(74) Attorney, Agent, or Firm—Carlson, Gaskey & Olds

(57) ABSTRACT

A drive line vibration sensor includes a housing having a strain gage attached to the drive line component, and an actuator disposed within the housing. In operation, the actuator exerts a force upon the strain gage proportional to acceleration experienced by the actuator. As the actuator is preferably a sphere manufactured of a low friction material, the friction between the actuator, strain gage, and the housing are minimized to improve the vibration sensor sensitivity. In another embodiment, the actuator is a pendulum attached to the housing by a pivot point having low friction bearings to reduce the effect of radial acceleration upon the measurement of longitudinal acceleration. A recording device is preferably in communication with the controller to record the pressure applied to the strain gage to provide an inexpensive diagnostic and maintenance system which can record the overall operation of a drive line under actual operational conditions.

12 Claims, 2 Drawing Sheets

STRAIN GAUGE VIBRATION SENSOR

BACKGROUND OF THE INVENTION

The present invention relates to an apparatus for detecting drive line system imbalances, and more particularly to an optical vibration sensor which records the vibration experienced by a drive line component.

A drive shaft typically includes an elongated tubular member which is operatively coupled to the transmission and axle assembly through a pair of universal joints or other similar coupling disposed on either end of the shaft. Alternatively, the drive shaft may include two or more elongated tubular members which are connected together by a universal joint or some other similar coupling device and connected between the transmission and wheel assembly.

The individual components of the drive line system discussed above often include inherent or residual imbalances due to variations in manufacturing tolerances. While steps can be taken to balance the individual components, residual imbalances often still remain. It is further known to balance the drive line system prior to, and after, installation into the vehicle. Typically, such balancing is effective to practically eliminate objectionable vibration in the drive line system of a fully assembled vehicle. However, mechanical wear, residual imbalances, and road conditions may eventually lead to the disruption of the drive line balance. Vehicle drive line systems which become unbalanced are unacceptable as they produce drive line vibrations which could eventually lead to failure.

Accordingly, it is desirable to provide a vibration sensor which measures the quantity of vibration that the drive line component is exposed to and which can record the overall operation of a drive line under actual operational conditions.

SUMMARY OF THE INVENTION

The vibration sensor of the present invention is preferably fabricated using micro machining technology such that the sensor is preferably fabricated as an integrated circuit chip. Accordingly, the micro-machined vibration sensor can be readily located in many small inaccessible locations of a vehicle drive line.

The vibration sensor of the present invention generally includes a housing having a strain gage attached to the drive line component, and an actuator disposed within the housing. The sensor is preferably positioned such that it is minimally affected by radial acceleration, yet remains sensitive to longitudinal accelerations along the longitudinal axis of a drive line component.

In operation, the actuator exerts a force upon the strain gage proportional to acceleration experienced by the actuator. The actuator is preferably in contact with the strain gage by disposing the actuator between a pair of opposed strain gages. As the actuator is preferably a sphere, the contact locations are minimized in area to further reduce the friction between the actuator, strain gage, and the housing. This improves the vibration sensor sensitivity.

The controller then identifies the pressure exerted by the actuator on the strain gage. Control and identification can be provided by signal processing circuitry well known in the art of pressure measurement.

In another embodiment, the actuator is a pendulum attached to the housing by a pivot point having low friction bearings. The pivot point and low friction bearings, again reduces the effect of radial acceleration upon the longitudinal acceleration measurement.

A recording device is preferably in communication with the controller to record the pressure the actuator applies to the strain gage. By recording the pressure, the present invention provides an inexpensive diagnostic and maintenance system which can record the overall operation of a drive line under actual operational conditions. Additionally vibration trends can be determined and tracked to provide data to calculate the life of a drive line or the like.

Further, the controller identifies whether the vibration sensor experiences a predetermined acceleration and activates a warning device. In the preferred embodiment, the controller activates a transmitter, such as a radio frequency (RF) transmitter which sends a signal to a remote waining device such as a warning light.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
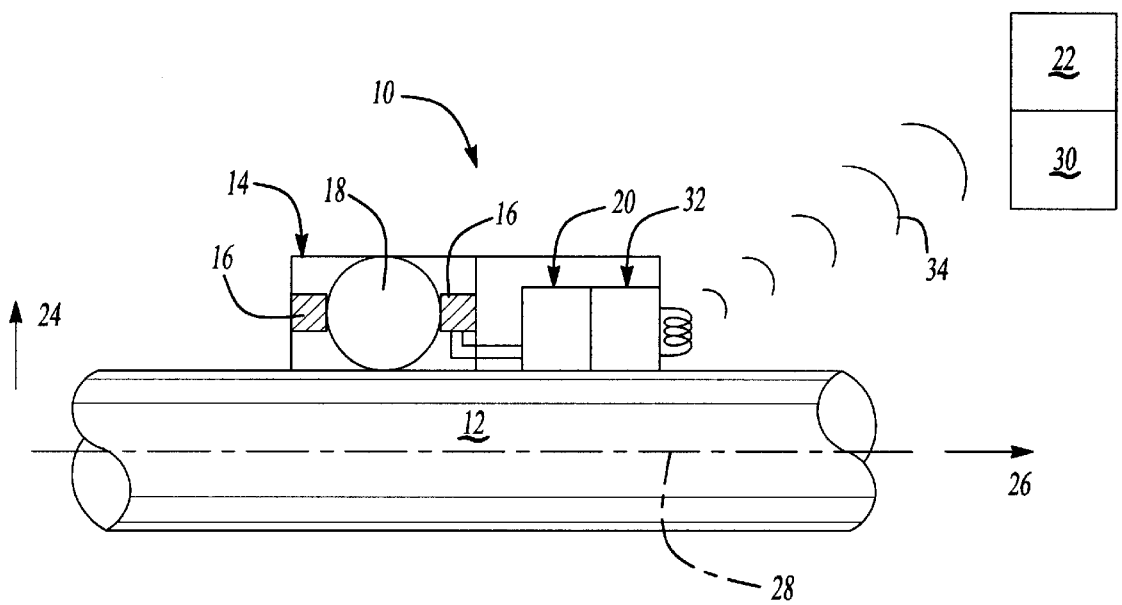
FIG. 1 is a general schematic representation of the driveline vibration sensor according to the present invention.

FIG. 1 illustrates a vibration sensor 10 according to the present invention. The vibration sensor 10 is preferably attachable or integral to a drive line component (shown rather schematically at 12) such as a drive shaft, connecting shaft, half-shaft or the like. The sensor 10 of the present invention is equally applicable to other types of rotating machinery or bearings that tend to become unbalanced and eventually produce undesirable vibrations.

The vibration sensor 10 of the present invention is preferably fabricated using machining technology in accordance with known integrated circuit technology. Although a single vibration sensor 10 is shown and described, one skilled in the art will realize that a plurality of vibration sensors 10 could be located in various locations and positions along the drive line 12 to identify vibrations from multiple locations and along several axises.

The vibration sensor 10 generally includes a housing 14 having a strain gage 16 attached to the drive line component 12, and an actuator 18 disposed within said housing 14. As will be more full described below, vibration causes the actuator 18 to exert a pressure on the strain gage 16. A controller 20 in communication with the strain gage 16 identifies the pressure applied to the strain gage 16 and activates a warning device 22 to alert an operator when a predetermined level of vibration is encountered.

The controller 20 can then identify the pressure exerted by the actuator 18 on the strain gage 16. Control and identification can be provided by signal processing circuitry well known in the art of pressure measurement.

A recording device 30 is preferably in communication with the controller 20 to record the pressure exerted by the actuator 18. By recording the pressure, the present invention provides an inexpensive diagnostic and maintenance system which can record the overall operation of a driveline under actual operational conditions. Additionally vibration trends can be determined and tracked to provide data to calculate the life of a driveline or the like.

In a preferred embodiment, the controller 20 communicates with a remote recording device 30. The controller 20 preferably communicates with the recording device 30 by a transmitter 32, such as a radio frequency (RF) transmitter that sends a signal 34 to the recording device 30. The controller 20 further communicates with the warning device 22 to alert an operator when a predetermined level of vibration is encountered.

The sensor 10 is preferably positioned such that it is minimally affected by radial acceleration (shown schematically by arrow 24) yet, remains sensitive to longitudinal accelerations (shown schematically by arrow 26) along the longitudinal axis 28 of a drive line component 12. Because the driveline component 12 is rotating at high speeds (proportional to vehicle speed and typically less than 3,000 RPM), the radial acceleration 24 is much greater in magnitude than the longitudinal acceleration 26. In addition, the radial acceleration 24 will effect (usually by 1%) the longitudinal acceleration 26. This creates difficulty when measuring the longitudinal acceleration 26.

Figure 2:
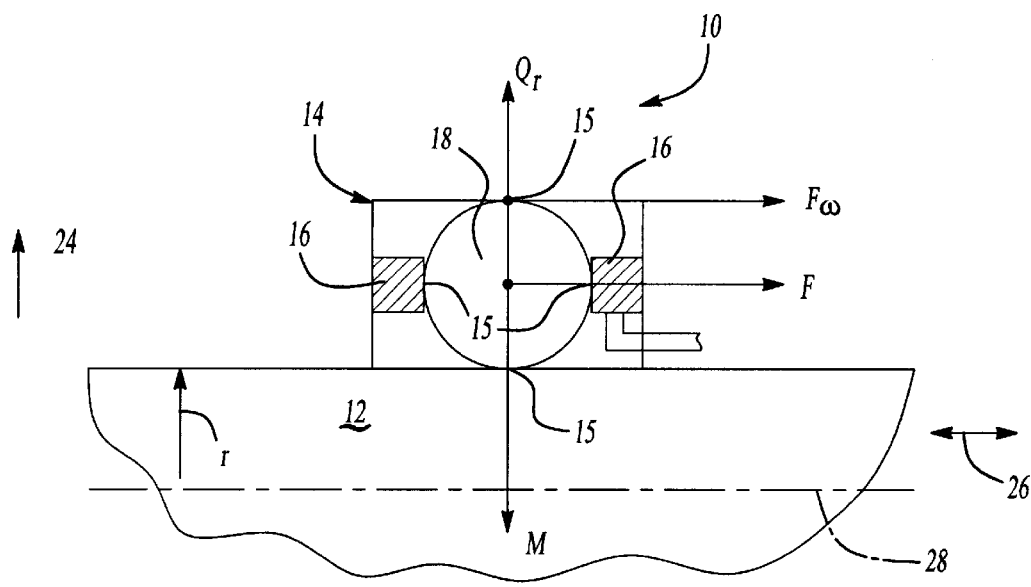
FIG. 2 is an exploded view of the driveline vibration sensor of FIG. 1.

FIG. 2 provides a somewhat schematic exploded view of the driveline vibration sensor 10 of FIG. 1 to further illustrate the forces acted upon the actuator which can be mathematically described by the following equations. The radial acceleration 24 the vibration sensor 10 experiences is proportional to the angular velocity ($\omega$) of the actuator 18 multiplied by the radial distance (r) from the drive line component 12 longitudinal axis 28:

$$a_r = \omega^2 \cdot r$$

while the longitudinal acceleration is:

$$a_l = (0.01) \cdot a_r + \hat{a}_l$$

where $\hat{a}_l$ is actual longitudinal acceleration vibration ($\approx 0$ for a typically acceptable drive line component). The tangential force created by the friction of the material of the actuator 18 when subjected to the radial acceleration 24 ($a_r$) during sliding can be described as:

$$F_T = \gamma \cdot m \cdot a_r$$

While the longitudinal force can be described as:

$$F_{long} = m \cdot a_6$$

where $\gamma$ is the coefficient of friction associated with the material of the 18, and (m) is the mass of the actuator 18 such that the total force acting upon the actuator 18 can be described as:

$$F = F_{long} - F_\omega$$

Thus, substituting:

$$F = m(a_l - \gamma \cdot a_r)$$

This equation illustrates that a problem in determining driveline vibration is that the measurement of radial acceleration 24 ($a_r$) will distort the measurement of the longitudinal acceleration 26 ($a_l$) as the radial acceleration 24 ($a_r$) can be higher than one hundred times the force of gravity (100 g) depending on the rotational speed of the driveline component 12 and its radius (r). It is therefore imperative to provide an actuator 18 of a material having a coefficient of friction less than 0.01 ($\gamma < 0.01$). A preferable material which accomplish this minimal friction is, for example only, a Molybdenum disulphide solid film lubrication. One skilled in the art will realize that other materials can be used and the present invention is not to be limited to only the listed material. To further reduce the friction that must be overcome it is preferable that the actuator 18 be manufactured as a sphere to minimize the contact area between the actuator 18, the strain gage 16, and the housing 14.

In operation, the actuator 18 exerts a force upon the strain gage 16 proportional to the acceleration experienced by the actuator 18. Because the actuator 18 is manufactured of a low friction material, the effect of sliding friction is minimized. To further provide an effective measurement of longitudinal acceleration 26, the strain gage 16 is preferably a pair of opposed strain gages having the actuator 18 disposed therebetween.

The actuator 18 is preferably in contact with the strain gage 16 by disposing the actuator 18 between the pair of opposed strain gages 16. The actuator can also be disposed within the housing 14 such that the actuator 18 contacts the housing 14 at discreet location. Further, because the actuator 18 is preferably a sphere, the contact locations 15 are minimized in area to further reduce the friction between the actuator 18, strain gage 16, and the housing 14. In other word, by minimizing the area of the contact locations 15 of the actuator 18 and manufacturing the actuator 18 of a low friction material, the effect of the radial acceleration 24 ($a_r$) distorting the measurement of the longitudinal acceleration 26 ($a_l$) can be minimized. This provides a vibration sensor 10 of improved sensitivity.

Figure 3:
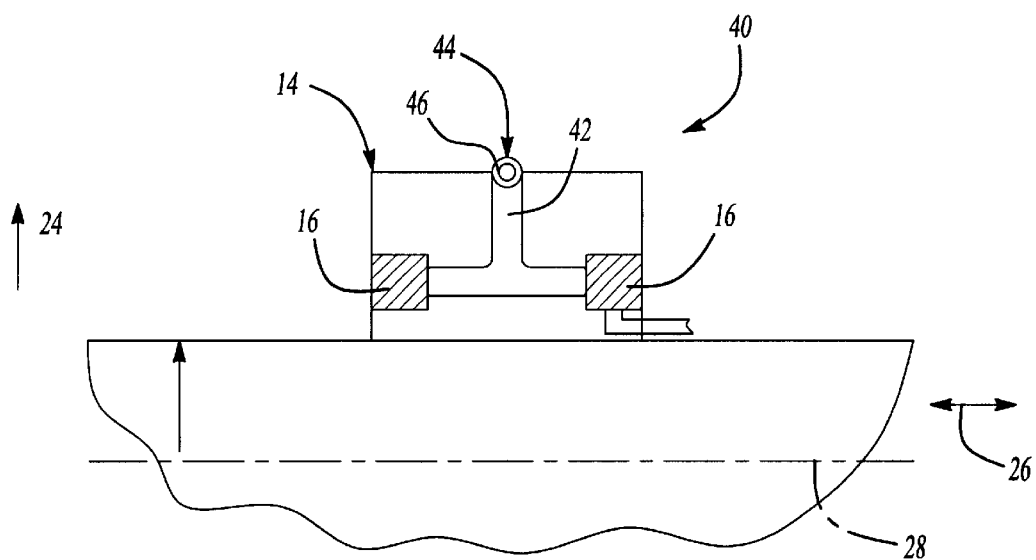
FIG. 3 is an alternate embodiment of the driveline vibration sensor according to the present invention.

FIG. 3 illustrates an alternate embodiment of the driveline vibration sensor 40 according to the present invention. The vibration sensor 40 operates in a similar manner as described above, however, the actuator 18 is a pendulum 42 having low friction bearings 44. The pendulum 42 can therefore be limited in motion such that the pendulum is affected only by longitudinal acceleration 26. Further, the pendulum is attached to the housing 14 at a pivot point 46. The pendulum 42, low friction bearing 44, and pivot point 46, again lend themselves to micro machining technology.

Accordingly, the pivot point 46 and low friction bearings 44, eliminates the need to constrain the pendulum 42 by the housing 14. In other words, the pendulum need only contact the housing 14 at the strain gage 16 and the pivot point 46. This again reduces the effect of radial acceleration 24 upon longitudinal acceleration 26 measurement and improves the vibration sensor 40 sensitivity.

The present invention thus provides a low cost system for monitoring vibrations and identifying a problem vibration level.

The foregoing description is to be exemplary rather than defined by the limitations within. Obviously, many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vibration sensor comprising:

a housing having a pair of opposed strain gages spaced along a longitudinal axis;

an actuator, being a sphere, and disposed within said housing and between said pair of opposed strain gages such that said actuator is substantially restrained from a radial acceleration subsmlially perpendicular to said longitudinal axis by said housing, a substantially longitudinal vibration along said longitudinal axis causing said actuator to exert a pressure on at least one of said pair of opposed strain gages; and a controller in communication with said strain gage, said controller operable to identify said presser applied to said at leas one of said pair of opposed strain gages.

2. The vibration sensor as recited in claim 1, wherein said actuator is manufactured of a low friction material.

3. The vibration sensor as recited in claim 1, wherein actuator is manufactured of a material having a coefficient of friction less than 0.05.

4. A vibration sensor comprising:

a housing having a pair of opposed strain gages spaced along a longitudinal axis;

an actuator, being a pendulum, and disposed within said housing and between said pair of opposed strian gages such that said actuator is substantially restrained from a radial acceleration substantially perpendicular to said longitudinal axis by said housing, a substantially longitudinal vibration along said longitudinal axis causing said actuator to exert a pressure on at least one of said pair of opposed strain gages; and a controller in communication with said strain gage, said controller operable to identify said pressure applied to said at least one of said pair of opposed strain gages.

5. The vibration sensor as recited in claim 4, wherein said pendulum is attached to said housing at a pivot point having bearings of a low friction material.

6. A drive line comprising:

a drive line component having a longitudinal axis;

a housing having a pair of opposed strain gages, said housing attached to said component;

a sphere dispose within said housing between said pair of opposed strain gages such that said sphere is substantially radially restrained by said housing when said drive line component is rotated about said longitudinal axis, at least one of said pair of opposed strain gages; and a controller in communication with said strain gage, said controller operable to identify said pressure applied to said at least one of said pair of opposed strain gages.

7. The drive line as recited in claim 6, wherein said recording device is remotely activatable by said controller.

8. The drive line as recited in claim 7, further comprising an RF transmitter in communication with said controller, said RF transmitter in communication with said recording device.

9. A drive line comprising:

a drive line component having a longitudinal axis;

a housing having a pair of opposed strain gages, said housing attached to said component;

a sphere disposed within said housing between said pair of opposed strain gages such that said sphere is substantially radially drained by said housing when said drive line component is rotated about said longitudinal axis, vibration of said drive line component causing said sphere to exert a pressure on at least one of said pair of opposed strain gages;

a controller in communication with said strain gage, said controller operable to identify said pressure applied to said strain gage; and a recording device in communication with said controller, said recording device operable to record pressure applied to said at least one of said pair of opposed strain gages.

10. The vibration sensor as recited in claim 9, wherein said sphere is disposed between said pair of opposed strain gages and contacts said housing at a plurality of locations remote from said pair of opposed strain gages.

11. The drive line as recited in claim 9, wherein said housing is attached to said component such that said pressure is applied in response to a longitudinal acceleration of said component.

12. The assembly as recited in claim 9, wherein said housing is integral to said shaft.

* * * * *

UNITED STATES PATENT AND TRADEMARK OFFICE
CERTIFICATE OF CORRECTION

PATENT NO.   : 6,257,065 B1   Page 1 of 1
DATED        : July 10, 2001
INVENTOR(S)  : Kyrtsos It is certified that error appears in the above-identified patent and that said Letters Patent is hereby corrected as shown below:

Column 5, claim 1,
Line 8, "subsmlially" should be -- substantially --.
Line 14, "presser" should be -- pressure --.
Line 15, "leas" should be -- least --.

Column 5, claim 6,
Line 42, "dispose" should be -- disposed --.

Column 6, claim 6,
Line 3, after "axis", the following should be added: -- , vibration of said drive line component causing said sphere to exert a pressure on at leasts one of said pair of opposed strain gages; --.

Column 6, claim 9,
Line 20, "drained" should be -- restrained --.

Column 6, claim 12,
Line 41, "said" should be -- a --.

Signed and Sealed this

Twelfth Day of March, 2002

Attest:

Attesting Officer

JAMES E. ROGAN
Director of the United States Patent and Trademark Office